March 30, 1965  M. E. HODGES  3,176,190
PHASE-COMPARISON PROTECTIVE RELAYING SYSTEM
Filed Dec. 16, 1960  4 Sheets-Sheet 3

Inventor:
Merwyn E. Hodges,
by Albert S. Richardson Jr.
Attorney.

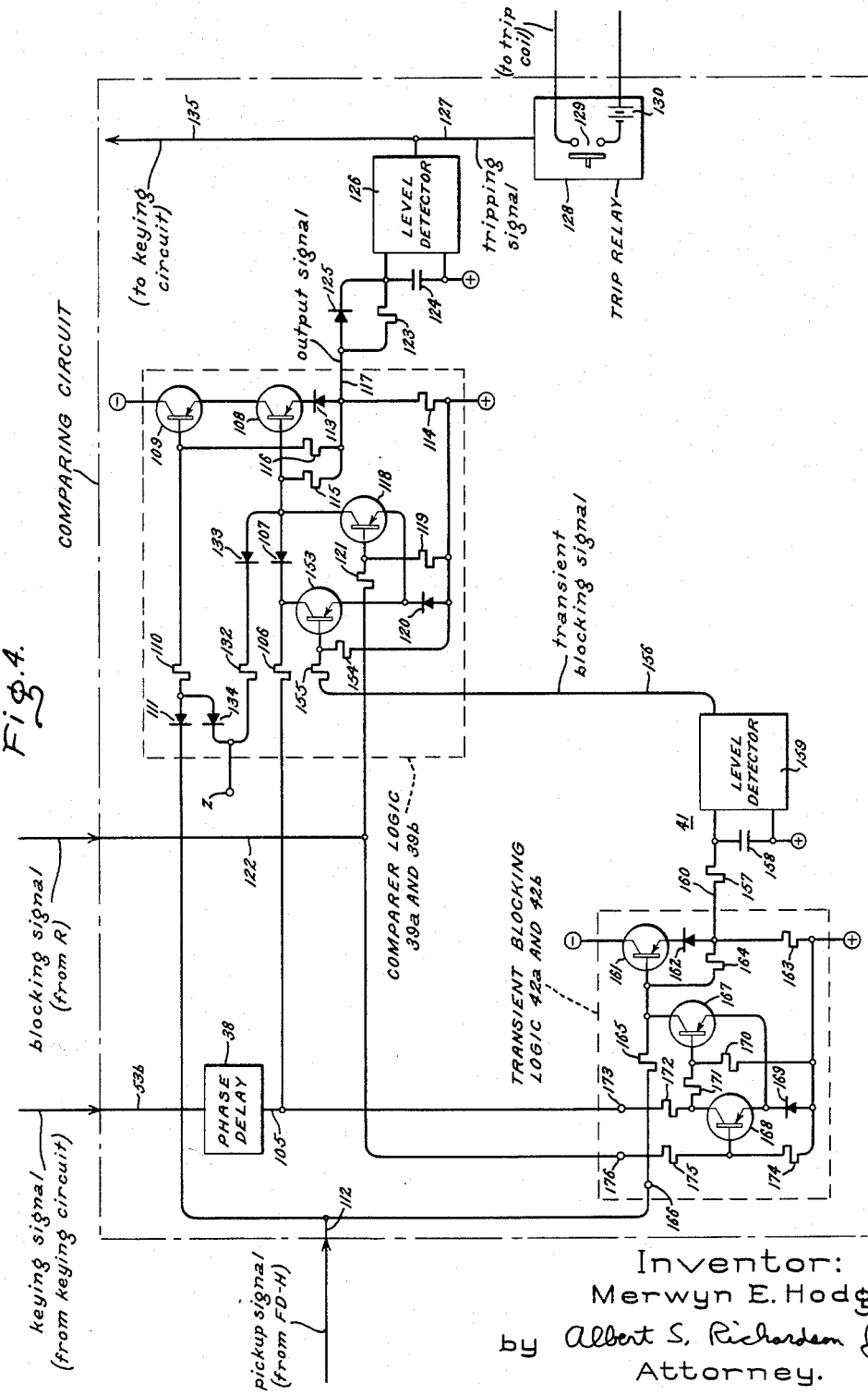

United States Patent Office 3,176,190
Patented Mar. 30, 1965

3,176,190
PHASE-COMPARISON PROTECTIVE
RELAYING SYSTEM
Merwyn E. Hodges, Philadelphia, Pa., assignor to General
Electric Company, a corporation of New York
Filed Dec. 16, 1960, Ser. No. 76,209
17 Claims. (Cl. 317—28)

This invention relates to a phase-comparison protective relaying system, and more particularly it relates to a "static" phase-comparison relaying system utilizing transistors and other static components instead of the conventional vacuum tubes and electromechanical relays of earlier phase-comparison systems.

The phase-comparison principle for protecting high-voltage electric power transmission lines is well known. In accordance with this principle, at each of the distant ends or terminals of the protected line a comparison is made of the relative time-phase positions of representative single-phase quantities derived from the line currents entering and leaving the line at its respective terminals. As long as the transmission line is sound, the representative quantities will bear a normal and consistent phase relationship to each other. But whenever a fault or short circuit condition occurs on the protected line, the phase of one of the representative quantities will reverse with respect to normal thereby effecting a predetermined relaying operation such as, for example, producing tripping signals for circuit breakers protecting the transmission line at the respective terminals thereof.

In order to make a phase comparison of the representative quantities derived at the various terminals of the protected line and to permit rapid and substantially simultaneous opening of the respective circuit breakers, the terminals must be interconnected by means of a pilot channel suitable for instantly conveying appropriate information from each terminal to all others. One well known method of obtaining this necessary intercommunication is by carrier-current wherein one of the phase conductors of the transmission line is used to carry a modulated high-frequency signal between terminals. Suitable signal transmitting and receiving means are provided at each terminal, and the modulated signal is utilized to restrain or block relay operation.

The phase-comparison relaying system is arranged so that modulated signals are transmitted alternately from the different terminals of the protected line during external or through fault conditions, and there is always a blocking signal present to prevent relay operation. However, when an "internal" fault occurs on the line, the resulting change in the relative phase relationship of the representative single-phase quantities derived at the respective terminals will cause the modulated signals to be transmitted simultaneously from all terminals, and during the interval when no signal is being sent from any terminal the relaying system becomes effective to produce the desired tripping signals for opening the respective circuit breakers.

A general object of the present invention is to provide an improved phase-comparison protective relaying system characterized by greater reliability, reduced maintenance and faster speed of operation than hitherto attained.

Another general object of the invention is the provision of a phase-comparison protective relaying system which does not employ vacuum tubes and electromechanical relays.

It is another object of the invention to provide a relatively compact and economical phase-comparison protective relaying system the circuit components of which are arranged and cooperate in a unique manner for high-speed operation with maximum security and reliability.

A further object is the provision, in a protective relaying system, of improved means for obtaining a transient blocking function the time delay operation of which is not initiated unless an external line fault has occurred.

Still another object is to provide a phase-comparison protective relaying system having a symmetry adjusting function, whereby a blocking signal of exactly one-half cycle duration is obtained at each terminal of the protected line in response to carrier-current transmission from another terminal during each cycle of operation.

In carrying out my invention in one form, I provide, at each terminal of the transmission line to be protected, means for deriving a single-phase A.-C. quantity which is representative of the line currents at the terminal under line fault conditions. Suitable means are provided for producing an intermittent keying signal at each terminal of the line in polarity response to the representative quantity derived at the same terminal, and the system is arranged so that the keying signals at different terminals are substantially 180 degrees out-of-phase during external or through fault conditions. A transmitter is provided at each of the line terminals to transmit carrier current upon operation thereof, and transmitter operation is effected, in accordance with my invention, by suitable fault responsive means whenever a line fault occurs. I utilize the intermittent keying signal at each terminal simultaneously to prevent operation of the associated transmitter, thereby stopping carrier-current transmission while this signal persists, and to activate comparing means located at the same terminal. A relaying operation is effected at each terminal when the comparing means is successfully activated. In order to prevent activation of the comparing means under external fault conditions, a carrier-current receiver is provided at each terminal of the line. The receiver operates, in response to carrier-current transmission from another terminal, to produce a blocking signal which is supplied to the associated comparing means for blocking activation thereof while the receiver is operating. With this arrangement, operation of the relaying system is effected when the intermittent keying signal produced at the respective terminals of the protected transmission line are in phase with each other, and this relationship exists only during internal fault conditions.

In one aspect of the invention, the speed of operation of the relaying system is increased by providing disabling means at each terminal for cancelling carrier-current transmission by the associated transmitter immediately in response to the initiation of the relaying operation by the comparing means at the same terminal. In another aspect of the invention, the accuracy of the system is improved and the marginal possibility of false operation is reduced by providing adjusting means, in connection with the keying signal producing means and the transmitter at each terminal, for so adjusting each interval of carrier-current transmission (during a line-frequency cycle) that the receiver at each terminal, in response to such transmission from another terminal, operates for a period of time just equal to one-half the duration of the line-frequency cycle. The adjusting means, in the preferred embodiment of the present invention, accomplishes this result by prolonging the stopping of carrier-current transmission for a predetermined interval at the end of each keying signal.

In still another aspect of my invention, operation of the protective relaying system is prevented, in delayed response to the occurrence of an external line fault condition, by the provision at each terminal of transient blocking means controlled by the receiver and by fault responsive means at that terminal for deactivating the associated comparing means upon the expiration of a predetermined minimum length of time (longer than one cycle) following the concurrence of operation of the fault responsive means and an out-of-phase condition of the intermittent keying signal at the respective line terminals.

My invention will be better understood and its various objects and advantages will be more fully appreciated from the following description taken in conjunction with the accompanying drawings in which:

FIG. 4 is a schematic circuit diagram illustrating the components and circuitry of the comparing circuit shown in block form in FIG. 2.

Figure 1:
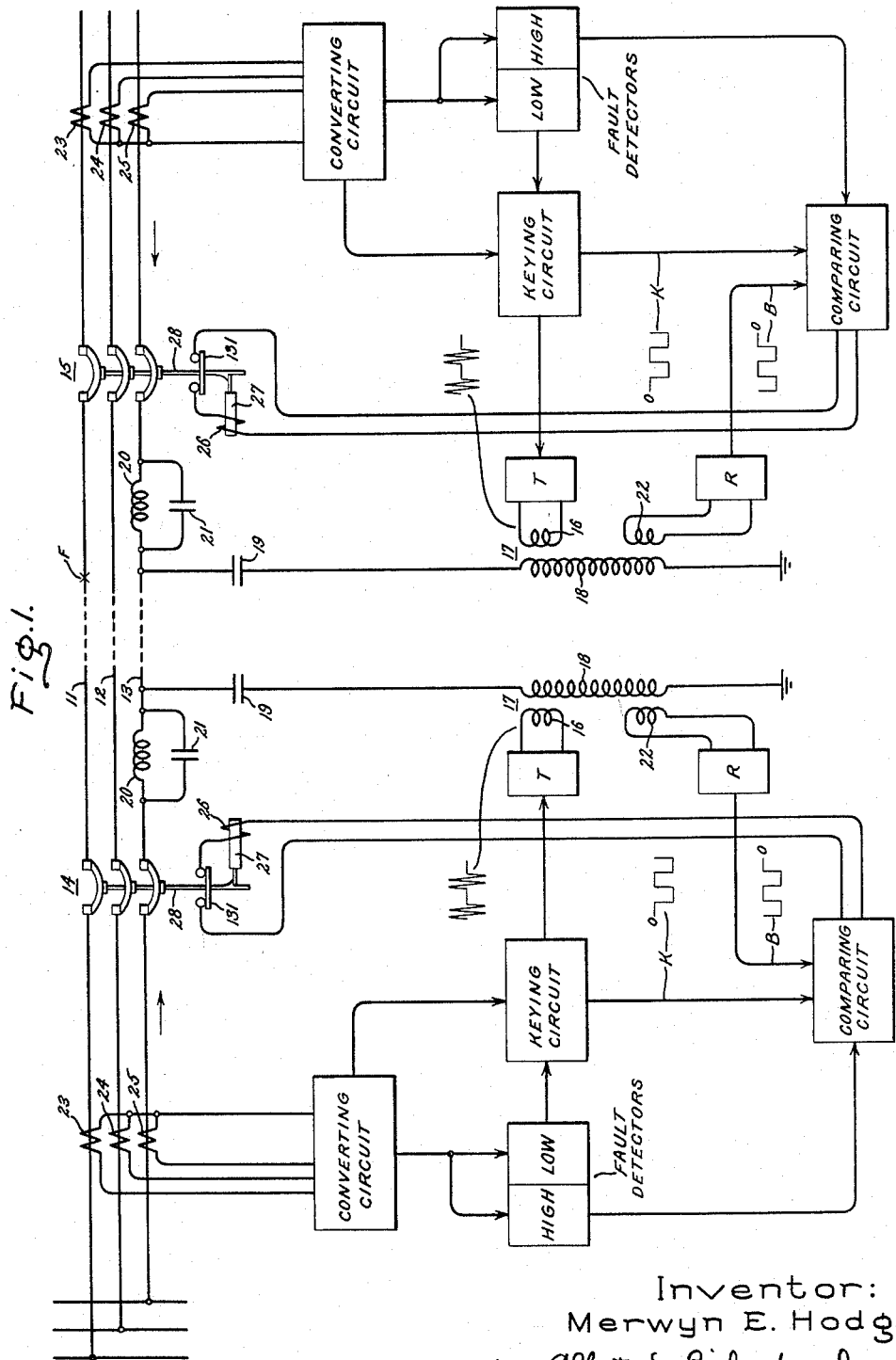
FIG. 1 is a schematic circuit diagram, partly in block form, of a high-voltage electric power transmission line protected by a relaying system of the phase-comparison, carrier-current pilot type.

Referring now to FIG. 1, I have shown in block form, for the purpose of illustrating a preferred embodiment of my invention, a phase-comparison protective relaying system for a 3-phase alternating-current electric power transmission line comprising conductors 11, 12 and 13. Two 3-pole high-speed circuit breakers 14 and 15 are located, respectively, at what will be referred to hereinafter as the local terminal and the remote terminal of the protected transmission line 11–13. These terminals would actually be located many miles apart. Although not shown in FIG. 1, in practice the transmission line may be tapped and employ an additional circuit breaker at still another distant terminal.

Substantially identical protective relaying equipment is provided at each terminal of the protected transmission line to open quickly and simultaneously both circuit breakers 14 and 15, thereby isolating the protected line, upon the occurrence of an internal fault, i.e., upon the occurrence of a short circuit between phase conductors or between a conductor and ground at some point along the line between the opposite terminals. The necessary intercommunication between the identical relaying equipments is accomplished in the illustrated embodiment of the invention by utilizing conductor 13 as a channel for the transmission of high-frequency carrier-current.

A carrier-current transmitter T is used at each terminal to transmit the high-frequency carrier current signal. The transmitter operates, when enabled by a suitable control signal, to generate an oscillating signal of high frequency, such as at 100,000 cycles per second, in a winding 16 of a transformer 17. As a result, carrier-current is induced in the transformer winding 18, which, as can be seen in FIG. 1, is connected between ground and a coupling capacitor 19. The coupling capacitor 19 is in turn connected to conductor 13 of the transmission line. The capacitor 19 is designed with sufficient insulation to withstand line voltage, and it easily passes high-frequency carrier current while presenting a high impedance to the transmission line current of power frequency (for example, 60 cycles per second).

A parallel resonant circuit comprising an inductance 20 and a capacitor 21 tuned to the carrier-current frequency is connected in series circuit relation with conductor 13 at each end of the transmission line to provide a wave trap which confines the carrier current to the protected transmission line extending between opposite terminals without introducing any appreciable impedance to current of power frequency in conductor 13.

The high-frequency signal voltage induced in winding 18 of the transformer 17 upon operation of a transmitter T will cause current flow in the loop comprising coupling capacitor 19, conductor 13, the corresponding winding 18 located at the opposite terminal, and a ground return path. Another winding 22 of the transformer 17 is connected to a carrier-current receiver R which, as is shown in FIG. 1, is provided at each terminal. Each receiver R is tuned to the frequency of the carrier current transmitted at the opposite terminal, and it is operably energized by a signal voltage induced in winding 22 by carrier current received from the opposite terminal. Although the illustrated relaying system will function successfully, if the transmitters T located at the respective terminals are arranged to generate oscillating signals of different frequencies, it is common practice to use a common frequency, whereby each receiver responds to the carrier current transmitted by the companion transmitter as well as by the distant transmitter.

As is shown in FIG. 1, at each terminal three instrument current transformers 23, 24 and 25 are coupled to the conductors connecting the associated circuit breaker to a 3-phase supply source or load bus of the electric power system. The secondary circuits of each set of these transformers are connected to what is identified in block form as a Converting Circuit. Within the Converting Circuit there is derived a single-phase line-frequency A.-C. quantity whose magnitude and phase are representative, respectively, of the magnitude and phase of line current at the associated terminal of the protected transmission line under line fault conditions. This representative quantity is supplied to a polarity-responsive Keying Circuit, and in rectified form it is fed to magnitude-responsive "high" and "low" set Fault Detectors.

Two dependent output signals of intermittent nature are produced by the Keying Circuit at each terminal. One of these signals controls the transmitter T, enabling it to operate when the representative quantity has a predetermined polarity and there is sufficient short-circuit current, as determined by the low-set Fault Detector, flowing in the transmission line. Thus, upon the occurrence of a fault on the protected transmission line or nearby, a carrier-current signal is periodically transmitted at each terminal—the periods of signal transmission corresponding to alternate half cycles of the representative quantity derived by the Converting Circuit at the same terminal.

The other output signal of the Keying Circuit, shown at K in FIG. 1, is produced during those intermediate half cycles of the representative quantity which are of a polarity opposite to said predetermined polarity. This signal is used to activate a Comparing Circuit in a manner tending to effect operation thereof. Before the Comparing Circuit can operate, however, it must also be supplied with a pickup signal from the high-set Fault Detector (which is adjusted to be less sensitive than the low-set Fault Detector to ensure that the transmitter T at one terminal of the line is always in operation when the Comparing Circuit at the other terminal operates). It will be apparent, therefore, that at each terminal of the protected transmission line, during a fault condition of sufficient severity to cause operable response of both high and low Fault Detectors, the representative quantity derived in the Converting Circuit is effective through the Keying Circuit to cause carrier-current transmission by the transmitter T during one-half cycle thereof and to activate the Comparing Circuit during the succeeding, opposite-polarity half cycle.

The Comparing Circuit shown in block form in FIG. 1, in addition to being supplied by the keying signal K from the Keying Circuit and being supervised by the high-set Fault Detector as mentioned above, is also supplied by a periodic blocking signal B from the associated carrier-current receiver R. The blocking signal B, which is produced upon operation of the receiver in response to carrier-current transmission from both the local and remote terminals, renders the Comparing Circuit inactive and prevents operation thereof. When it does operate, the Comparing Circuit will produce a tripping signal for initiating the energization of a trip coil 26 of the associated circuit breaker (14 or 15). Energization of the trip coil 26 actuates a latch 27 thereby releasing switch member 28 of the circuit breaker for rapid circuit interrupting movement.

In order for the Comparing Circuit to effectuate tripping, it must be energized by the keying signal K and a pickup signal from the high-set Fault Detector in the absence of a blocking signal B. The blocking signal, being produced in response to carrier-current transmission from the opposite terminal during those alternate half cycles of the representative quantity derived at that terminal which are of said predetermined polarity, is indicative of the phase position of the representative quantity at the opposite terminal. It is the Comparing Circuit, therefore, which enables the phase-comparison protective relaying system to compare at each terminal of the protected line the relative phase positions of the representative quantities derived from the line currents at the respective line terminals.

The Converting Circuits located at the opposite terminals of the protected transmission line are so coordinated and arranged that when the line currents at the two terminals are substantially in phase, as during a fault which is external to the protected line, the representative quantities derived at the respective terminals are substantially 180-degrees out-of-phase with each other and carrier current is transmitted from the terminals alternately, whereby a blocking signal is produced at each terminal concurrently with the application of the keying signal K to the Comparing Circuit. Consequently, no tripping signal can be produced.

However, upon the occurrence of a fault on the protected line, such as shown at F in FIG. 1, the line current at the illustrated terminals will become substantially 180 degrees out-of-phase, and consequently the phase of one of the representative quantities reverses so that carrier-current will now be transmitted simultaneously from both terminals for half cycle intervals during each line-frequency cycle. Under conditions of simultaneous transmission during one half cycle, there will be no blocking signal available at either terminal to prevent effective operation of the Comparing Circuits during the other half cycle when the Comparing Circuits are being activated by the keying signals K. Under such conditions, which have been illustrated in FIG. 1, tripping signals are quickly produced at both terminals, and the faulted transmission line is immediately isolated by the respective circuit breakers.

Figure 2:
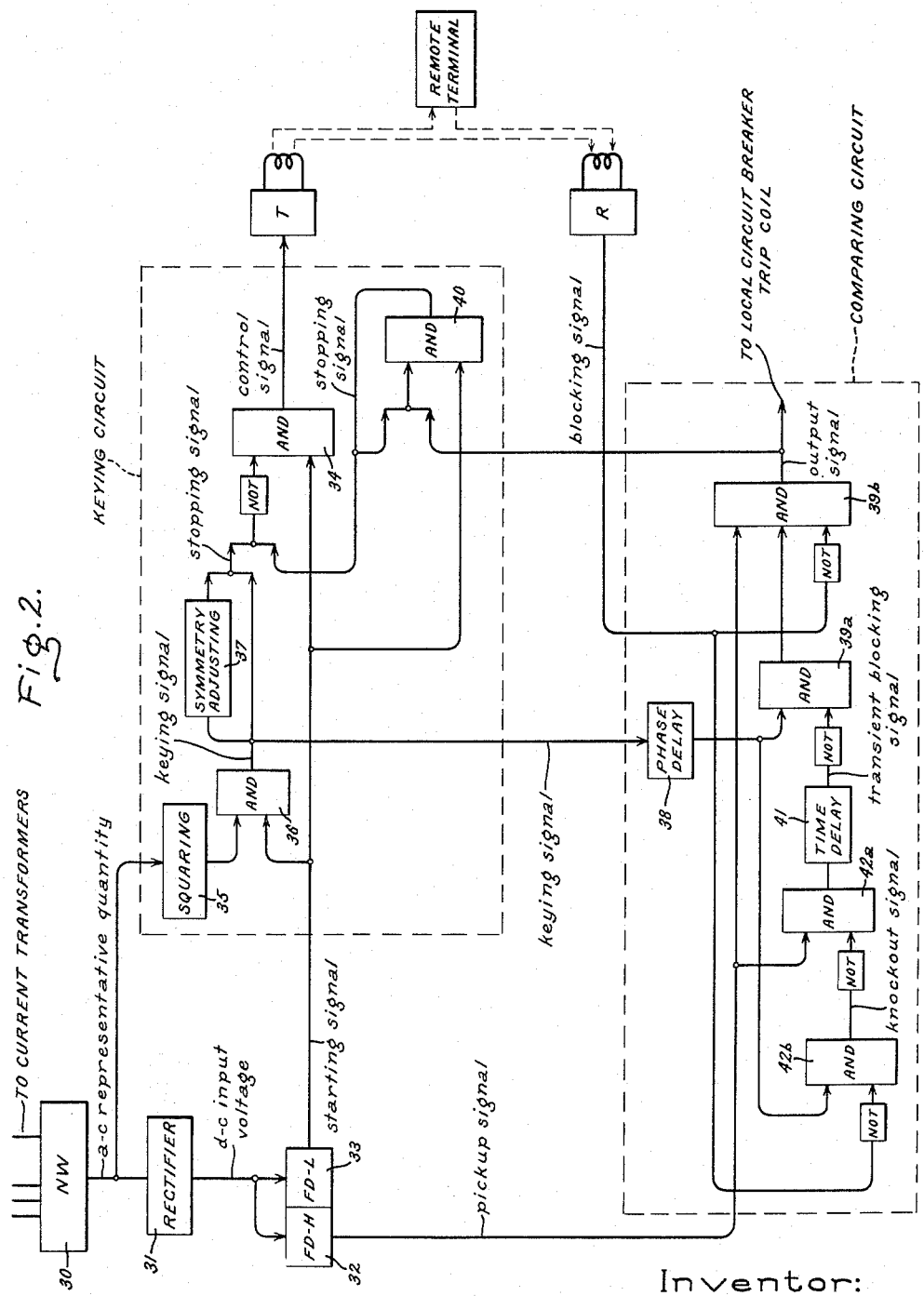
FIG. 2 is a more detailed block diagram of the protective relaying system shown at one terminal of the transmission line of FIG. 1, the system as illustrated in this figure being constructed and arranged in accordance with a preferred embodiment of my invention.

In order now to explain the various refinements of my phase-comparison protective relaying system, I have shown schematically in FIG. 2 a more detailed block diagram of the system components provided at the local terminal of the protected transmission line. Although indicated in FIG. 2 as only a single block labeled "REMOTE TERMINAL," for the sake of drawing simplicity, it will be understood that the arrangement of components at the remote terminal of the line is substantially a duplicate of that shown for the local terminal.

The single-phase line-frequency representative quantity referred to hereinbefore is derived from line currents at the local terminal by suitable phase responsive means indicated generally in FIG. 2 by the block 30 labeled "NW." The phase responsive means comprises a phase sequence network or filter which is coupled to the transmission line by the current transformers 23–25 (FIG. 1). Such a network, as is well known to those familiar with the theory of symmetrical components, is capable of producing a single-phase resultant voltage which is a function of a particular phase sequence component, or a predetermined combination of such components, of transmission line current. The relative polarities of the phase responsive means located at both the local and the remote terminals of the protected line are such that the representative quantities derived thereby are substantially 180 degrees out-of-phase with respect to each other whenever the line currents entering and leaving the respective terminals are in phase.

Although any conventional phase sequence network could satisfactorily be used as the phase responsive means NW in my relaying system, I prefer to use the improved design disclosed and claimed in my Patent No. 3,154,737, granted on October 27, 1964, and assigned to the assignee of the present invention. In accordance with the referenced disclosure, the phase responsive means NW will derive a single-phase, line-frequency A.-C. voltage proportional to the negative-phase-sequence line current under all unbalanced line fault conditions, and it is rendered operative to derive a voltage dependent upon the positive-phase-sequence line current in response to the occurrence of a balanced, 3-phase fault condition.

The A.-C. representative quantity derived by the phase-responsive means NW is fed to the magnitude-responsive high and low set Fault Detectors, referred to hereinbefore, by way of a rectifier represented in FIG. 2 by the block 31. The function of this rectifier is to supply each Fault Detector with a D.-C. input voltage the magnitude of which, being proportional to the amplitude of the representative quantity, is a measure of the severity of a line fault. The rectifier 31 may be of an conventional design, but for best results in my high-speed relaying system I prefer to use an arrangement such as that disclosed and claimed in Patent No. 3,088,066, granted on April 30, 1963, to Harold T. Seeley and assigned to the assignee of the present invention.

In FIG. 2 the high-set Fault Detector and the low-set Fault Detector are shown as blocks 32 and 33 labeled, respectively, "FD–H" and "FD–L." Both are similar in design and operate to produce output signals having substantially constant magnitudes in response to the attainment by their respective inputs of predetermined critical levels of magnitude. Since the input magnitude varies in accordance with the amount of transmission line current flowing at the local terminal under fault conditions, operation of the Fault Detectors FD–H and FD–L indicates that a short circuit or fault condition has occurred on the line.

Preferably, each of the Fault Detectors comprises a transistorized level detector circuit such as that disclosed and claimed in my copending patent application Ser. No. 25,915, filed on May 2, 1960, and assigned to the assignee of the present invention, now Patent No. 3,067,340. The high-set fault detector FD–H operates, in response to the magnitude of its input attaining a predetermined level, to produce a continuous pickup signal which is supplied to the Comparing Circuit. The low-set Fault Detector FD–L operates, in response to its input magnitude attaining a different predetermined level which is lower than the level of input to which FD–H responds, to produce a continuous starting signal which is supplied to the Keying Circuit.

The Keying Circuit shown in FIG. 2 comprises a group of components arranged and interconnected in a manner to perform two principal functions. These functions are: (1) to supply an appropriate control signal to the transmitter T, when energized by a starting signal received from the low-set Fault Detector FD–L, for effecting the periodic transmission of carrier current in accordance with the polarity of the A.-C. representative quantity derived by the phase responsive means NW; and (2) to supply a keying signal to the Comparing Circuit for intermittent activation thereof in accordance with the polarity of the representative quantity. Although preferred circuitry for various elements of the Keying Circuit will be described in detail hereinafter, with reference to FIG. 3, further consideration will first be given to the manner in which these elements are coordinated in order to perform the above-mentioned functions.

Figure 3:
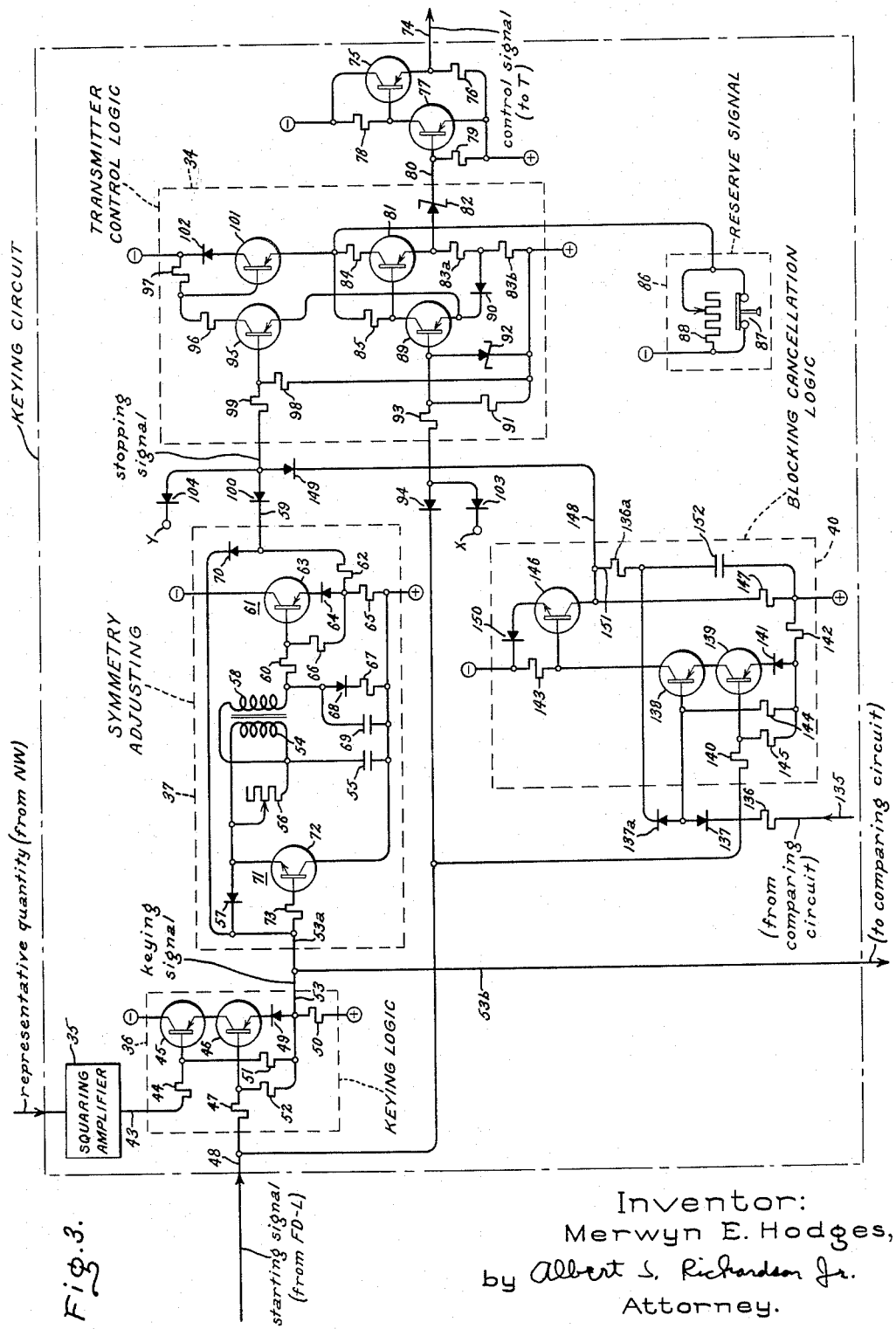
FIG. 3 is a schematic circuit diagram illustrating the components and circuitry of the keying circuit shown in block form in FIG. 2.

The starting signal received from FD–L is channeled wihin the Keying Circuit directly to a transmitter control logic component 34 which has been labeled "AND" in FIG. 2. The details of a preferred logic component 34 are shown in FIG. 3 and will be described hereinafter. It is sufficient for the present to understand that a control signal for initiating operation of the transmitter T is produced by this component when it is energized by the starting signal *in the absence* of a stopping signal (see below). Thus, the transmission of carrier current is caused by FD–L which operates under line fault conditions.

The transmitter control logic component 34 is so arranged that it will NOT produce a control signal during the periods it is energized by an intermittent stopping signal. This transmitter stopping signal is derived from the A.-C. representative quantity supplied to the Keying Circuit by the phase responsive means NW. The representative quantity, as can be seen in FIG. 2, is fed to a polarity sensitive squaring amplifier 35. The squaring amplifier is inactive during alternate half cycles of the representative quantity, while during intermediate half cycles of this quantity it has a square-wave output. In other words, an output of substantially constant magnitude is produced by the squaring amplifier 35 whenever the representative quantity has a certain polarity.

The output of the squaring amplifier 35 is used to energize a keying logic component 36 which has been labeled "AND" in FIG. 2. The component 36 is also energized by the starting signal of FD–L, and it operates to produce a keying signal only during those intermittent periods when it is energized simultaneously by the starting signal and the output of the squaring amplifier. Thus the periods of the keying signal have a time correspondence to the intermediate half cycles of the A.-C. representative quantity derived by the phase responsive means NW. (The term "period," as it is used in this specification with reference to intermittent or periodic signals, is meant to identify only a portion of time or an interval during which such a recurring signal is in existence.)

As is shown in FIG. 2, the intermittent keying signal travels from the keying logic component 36 along two different channels. One channel carries the signal to a symmetry adjusting component 37, and the output of this component comprises the transmitter stopping signal referred to above. The symmetry adjusting component 37 provides means for adjusting the length of each stopping signal period, and consequently for adjusting each interval of carrier-current transmission from the local transmitter T, so that the duration of operation of the carrier-current receiver located at the remote terminal of the protected line is, during a line-frequency cycle, just equal to one-half the duration of such a cycle. I prefer to accomplish this time adjustment by designing component 37 so that the transmitter stopping signal is contemporaneous with the keying signal and persists for a predetermined short interval following the conclusion of each of the keying signal periods. Thus the initiation of carrier-current transmission is delayed slightly at the conclusion of each keying signal period, and the transmitter T is able to operate only for intervals which are less than one-half cycle in duration. Since characteristically the receiver of a carrier-current pilot system remains "on" for a period of time slightly longer than the period during which carrier current is transmitted, it is possible in the manner just described to limit the duration of operation of the receiver R to periods of exactly one-half cycle.

By means of a second channel or circuit, the intermittent keying signal produced by the keying logic component 36 is supplied directly to the Comparing Circuit of my protective relaying system. The Comparing Circuit, as shown in FIG. 2, comprises a group of components arranged and interconnected in a manner to accomplish two results. The first of these results is the production of an appropriate signal, for tripping the local circuit breaker 14, when energized by a pickup signal received from the high-set Fault Detector FD–H if the intervals of its activation by the keying signal are not concurrent with operation of the local receiver R. The other result is accomplished later, after a predetermined time delay following any occurrence of an external or through fault condition, and comprises the blocking or prevention of operation of the Comparing Circuit. Although preferred circuitry for various elements of the Comparing Circuit will be described in detail hereinafter, with reference to FIG. 4, further consideration will first be given to the manner in which these elements are coordinated in order to obtain the above-mentioned results.

The intermittent keying signal received from the Keying Circuit is supplied to a phase delay component 38 of the Comparing Circuit, and the output of this component is channeled through a blocking logic component 39a to a comparer logic component 39b each of which has been labeled "AND" in FIG. 2. The comparer logic component 39b is also energized by the continuous pickup signal received from FD–H, and it is connected to the local receiver R for response to the blocking signal received from R upon operation thereof. While the details of a preferred logic component 39b are shown in FIG. 4 and will be described hereinafter, it is only necessary for the present to know that this component operates to produce an output signal, utilized to initiate tripping of the local circuit breaker 14, when activated in response to the coexistence of a pickup signal and a keying signal *in the absence* of the blocking signal. The comparer logic component 39b is rendered inactive and will NOT produce an output signal during half-cycle periods that the local receiver R is operating to produce the blocking signal.

The phase delay component 38 referred to above provides means for controllably shifting, with respect to the periods of the intermittent keying signal, the half-cycle intervals during which the comparer logic component 39b is activated during successive line-frequency cycles, whereby each interval of activation is concurrent with operation of the associated receiver R whenever the transmission line currents at the two terminals of the protected line are substantially in phase. In other words, the relaying system is so coordinated and arranged that at each terminal, during an external or through fault condition (the line currents entering and leaving the protected line at its respective terminals being then in phase and the representative quantities derived by the phase responsive means NW located at the respective terminals being consequently 180 degrees out-of-phase), the intervals of activation of the comparer logic component, in response to the production of a keying signal at the same terminal, exactly coincide with the half-cycle periods of the blocking signal produced by the associated receiver R in response to carrier-current transmission from the opposite terminal. Under such a condition no output can be produced by the comparer logic component 39b at either terminal.

Immediately upon the occurrence of an internal fault condition: the relative directions of the line currents at the local and remote terminals change; the representative quantities derived at both terminals, and consequently the keying signals produced in polarity response thereto, become nearly in phase with each other; and no blocking signal is supplied to the comparer logic components 39b during the major portion of each interval of activation thereof. As a result, the comparer logic component is able to operate, and tripping signals are obtained at both terminals of the line. The use of the phase delay component 38, in conjunction with the above-described symmetry adjusting component 37 of my invention, enables the relaying system to operate properly with both the minimum possibility of tripping on an external fault and the maximum opportunity to trip on an internal fault.

After a decision to trip has finally been made at the local terminal, but before the circuit breaker 14 has been able to complete its circuit interrupting action, there is a possibility that continued carrier-current transmission from the local terminal may undesirably interfere with the prompt production of a tripping signal by the Comparing Circuit located at the remote terminal. Such a possibility has been avoided in my relaying sytsem by utilizing the output of the comparer logic component 39b to energize a blocking cancellation logic component 40 which is operable to supply a transmitter stopping signal to the transmitter control logic component 34 of the Keying Circuit. The stopping signal supplied by the blocking cancellation component 40 serves to disable the associated transmitter T and thus prevent carrier-current transmission, whereupon the receiver located at the opposite terminal is rendered inoperable and its blocking signal is cancelled.

As indicated in FIG. 2, the blocking cancellation logic component 40 is an "AND" circuit; it operates to produce a continuous stopping signal when simultaneously energized by both the output of the comparer logic component 39b and the continuous starting signal of the low-set Fault Detector FD–L. A "seal-in" circuit is provided by feeding a portion of its stopping signal back into the component 40, in parallel with the output of the comparer logic component 39b, whereby continuous operation of the blocking cancellation component is sustained until FD–L stops operating. FD–L does not stop operating until the local circuit breaker has successfully interrupted the fault current flowing in the transmission line at the local terminal.

The phase-comparison protective relaying system is subject to false operation, due principally to transient effects in the phase response means NW, when an external or through fault condition is cleared by the opening of appropriate circuit breakers protecting some other section of the high-voltage electric power sytsem. To guard against this possibility, the Comparing Circuit of my relaying system is provided with suitable components, to be described below, for performing a time delay transient blocking function. In accordance with the transient blocking function, activation of the comparer logic component 39b in response to the intermittent keying signal, and hence the production of a tripping signal at the local terminal, is prevented in delayed response (preferably a delay of one and one-half cycles on a line-frequency base) to the occurrence of an external fault condition, and the component 39b is then maintained inactive until the external fault is cleared and for another one and one-half cycles time delay thereafter.

The transient blocking components of the Comparing Circuit include a time delay circuit 41. The time delay circuit 41 produces an output signal (indicated in FIG. 2 as the "transient blocking signal") which is supplied to the blocking logic component 39a where its presence blocks the passage of the intermittent signal from the phase delay component 38 to the comparer logic component 39b, thereby preventing activation of the comparer logic component 39b. The time delay circuit 41 is arranged to produce its output signal only after a time delay of one and one-half cycles upon continuous energization thereof; it is unable to produce an output when energized periodically on a half-cycle basis.

The time delay circuit 41 is energized by the output of a pickup logic component 42a which has been labeled "AND" in FIG. 2. This component is connected to the high-set Fault Detector FD–H, and it operates to energize the time delay circuit 41 upon receiving a pickup signal from FD–H. However, the pickup logic component 42a is so arranged that it can NOT operate when additionally energized by a knockout signal received from a knockout logic component 42b which is connected to the phase delay component 38 for activation during the intervals of activation of the comparer logic component 39b of the Comparing Circuit.

The knockout logic component 42b is also connected to the local carrier-current receiver R and is so arranged that it will NOT produce the knockout signal in the presence of a blocking signal received from R. In other words, the knockout logic component 42b, which generates a knockout signal periodically to disable the pickup logic component 42a in controlled response to the intermittent keying signal, is itself disabled and its disabling effect on component 42a is blocked or prevented throughout the periods of local receiver operation. Consequently, when the successive intervals of activation of the knockout logic component 42b are concurrent with the half-cycle periods of operation of the local receiver R, as they are under external fault conditions, the pickup logic component 42a is operable continuously to energize the time delay circuit 41, thereby initiating the time delay transient blocking function which renders the comparer logic component 39b inactive at the local terminal of the protected transmission line. On the other hand, whenever there is a 180-degree displacement between an interval of activation and the period of receiver operation, as during an internal line fault condition, a half-cycle periodic knockout signal is produced, the time delay circuit 41 is energized only between successive periods of the knockout signal, and the time delay circuit can produce no output signal (or its output signal, if it was previously being produced, is discontinued after a time delay of one and one-half cycles), whereby the Comparing Circuit at the local terminal proceeds normally to produce a tripping signal.

Turning next to FIG. 3, preferred embodiments of the Keying Circuit components of my phase-comparison protective relaying system will now be described in greater detail. The squaring amplifier 35, which is energized by the single-phase A.-C. representative quantity derived from line currents at the local terminal by the phase responsive means NW, has again been shown in block form in FIG. 3. Any conventional single-stage D.-C. amplifier having a half-cycle unipolarity output of substantially constant magnitude in response to A.-C. energization may satisfactorily be used for this component. As has been mentioned hereinbefore, the half-cycle periods of output of the squaring amplifier 35 are concurrent with intermediate half-cycles of the A.-C. representative quantity; that is, the amplifier 35 has a constant-magnitude output whenever the representative quantity has a given polarity.

During each of its output periods, the squaring amplifier 35 causes a conductor 43 emanating therefrom to be energized by an electric potential which is negative with respect to a predetermined reference level of potential. The reference level of potential is that of a reference bus connected to the positive terminal of a suitable source of D.-C. supply voltage. For the sake of drawing simplicity I have used throughout FIGS. 3 and 4 the encircled positive and negative symbols "+" and "−" to represent the terminals of a single source of regulated D.C. supply voltage, with the relatively positive terminal (+) comprising the common reference bus for the transistor circuits illustrated. The magnitude of the supply voltage preferably is 25 volts. The magnitude of the negative-going output potential of the squaring amplifier 35 preferably is greater than 90 percent of the supply voltage magnitude.

The squaring amplifier 35 is connected by means of the conductor 43 and a current limiting resistor 44 to the base electrode of a PNP transistor 45 located within the keying logic component 36 of the Keying Circuit. The base electrode of another PNP transistor 46, which is disposed in tandem with transistor 45, is connected through a current limiting resistor 47 to a conductor 48 which is energized by the starting signal received from the low-set Fault Detector FD–L. The potential of the starting signal is negative with respect to the reference bus and has a magnitude nearly equal to the magnitude of the supply voltage.

As can be seen in FIG. 3, the collector of the transistor 45 is connected directly to the negative supply voltage terminal. The emitter of transistor 45 and the collector of transistor 46 are interconnected as shown. The emitter of the transistor 46 is connected to the reference bus through a silicon diode 49 and an emitter follower resistor 50. A base resistor 51 is connected between the emitter follower resistor 50 and the base electrode of transistor 45, while a base resistor 52 is connected between resistor 50 and the base electrode of transistor 46.

The silicon diode 49 is poled in agreement with the emitter-base junctions of the tandem transistors 45 and 46. This diode is provided to ensure that the transistors do not operate as a result of collector leakage current. Since a silicon diode inherently presents a relatively high impedance to the passage of a small quantity of forward current, the greater portion of the collector leakage current of transistor 46 prefers to follow a parallel path through the base resistor 52 thereby avoiding amplification which would take place if it were able to follow a path through the emitter-base junction of transistor 46. As a result, the transistor 46 will remain inactive until its base electrode is energized by the starting signal.

The keying logic component 36 operates to produce its keying signal only when both of the transistors 45 and 46 are rendered conductive. As long as either transistor is in a non-conductive condition (inactive), the emitter follower resistor 50 is coupled to the negative supply voltage terminal through a very high-impedance circuit, and the potential level of a conductor 53 connected to the relatively negative terminal of this resistor is substantially the same as that of the reference bus. But with both transistors rendered conductive, their emitter-collector circuits are both in low-impedance states, a large portion of the supply voltage appears across the resistor 50, and the conductor 53 is effectively energized by a relatively large negative potential.

It is apparent in FIG. 3 that in order for both of the transistors 45 and 46 to be conductive, their respective base electrodes must simultaneously be energized by the squaring amplifier output and the starting signal, respectively. As soon as the negative starting signal is applied to component 36, current flow is effected in the emitter-base junction of transistor 46 thereby activating this transistor. However, no significant amount of collector current can flow until the emitter-base junction of the companion transistor 45 is forward biased by the negative-going output of the squaring amplifier 35. The emitter follower resistor 50 is effectively energized only during the periods of simultaneous activation of both transistors. Thus, under line fault conditions, the keying logic component 36 develops at conductor 53 an intermittent keying signal the periods of which depend upon the operation of the squaring amplifier 35 and hence have a time correspondence to intermediate half cycles of the A.-C. representative quantity derived by the associated phase responsive means NW.

As can be seen in FIG. 3, the conductor 53 emanating from component 36 divides into two parallel branches 53a and 53b, and these conductors are separately connected to the reference bus via the symmetry adjusting component 37 of the Keying Circuit and the phase delay component 38 of the Comparing Circuit, respectively. Thus, the intermittent keying signal produced by component 36 is carried both to the Comparing Circuit, which it activates in a manner to be described hereinafter, and to the symmetry adjusting component 37 which responds thereto, in a manner now to be described, by producing a transmitter stopping signal.

The function of the symmetry adjusting component 37, as has been mentioned hereinbefore, is to lengthen the periods of the transmitter stopping signal, relative to the half-cycle keying signal periods, so that the periods of carrier-current transmission by the local transmitter T are slightly shorter than one-half cycle in duration. To accomplish this function, I use time delay means, including an electric energy storing circuit, which is subject matter of my divisional patent application Ser. No. 413,580, filed November 24, 1964, and assigned to the assignee of the present application.

As it is shown in FIG. 3, the time delay means in the symmetry adjusting component 37 comprises an energy storing circuit which includes a series-connected inductance element 54 and a parallel-connected capacitor 55. The inductance element 54 and capacitor 55 are connected in series circuit relationship between the reference bus and the branch conductor 53a. An adjustably tapped resistor 56 is connected across element 54, and impedance means, preferably comprising a diode 57 poled as shown, is serially inserted between the element 54 and conductor 53a. The value of capacitance, measured in microfarads, of the capacitor 55 is preferably chosen to be about equal to the value of inductance, measured in henries, of the inductance element 54.

The inductance element 54 is one of two magnetically and conductively coupled windings 54 and 58 comprising an autotransformer, and the secondary winding 58 is provided with about four times the number of turns as winding 54. The secondary winding 58 and capacitor 55 are serially connected between the reference bus and a conductor 59 by means including: a current limiting resistor 60; signal amplifying means 61; and impedance means preferably comprising a relatively small resistor 62. The transmitter stopping signal developed by the symmetry adjusting component 37 appears at the conductor 59.

As can be seen in FIG. 3, the signal amplifying means 61 comprises a PNP transistor 63. The collector of this transistor is connected directly to the negative supply voltage terminal, while the emitter is connected to the reference bus through a silicon diode 64 and an emitter follower resistor 65. The diode 64 serves the same purpose as that served by diode 49 described earlier in connection with the keying logic component 36. The base electrode of transistor 63 is connected to the current limiting resistor 60, and there is a base resistor 66 connected between resistors 65 and 60 as shown. The emitter-base junction of transistor 63 will be forward biased, and the transistor is consequently rendered conductive, when there is a negative potential corresponding to the keying signal magnitude at the output end of the autotransformer winding 58.

In order safely to limit the amount of positive-going voltage to which the base electrode of transistor 63 is subjected during operation of the symmetry adjusting component 37, a relatively small resistor 67 and an appropriately poled diode 68 are connected in series between the reference bus and the output end of the secondary winding 58 of the time delay means. A surge suppressing capacitor 69 of relatively small capacitance compared to that of the capacitor 55 is connected across the series combination of resistor 67 and diode 68.

The operation of the time delay means comprising capacitor 55 and the autotransformer windings 54 and 58 to provide an output voltage, the magnitude of which changes in delayed response to changes in the magnitude of the unipolarity voltage applied to conductor 53a, will now be explained. Briefly stated, the rate of charging or discharging of the capacitor 55, in response to a sudden increase or decrease in magnitude of the applied voltage, is limited by the magnetizing impedance of winding 54. The resulting change of magnetic flux in the autotransformer induces a voltage across both of its windings which surges to a peak and then rapidly decays toward zero as the capacitor voltage approaches its new level of magnitude. The output voltage comprises the sum of the capacitor voltage and the induced voltage of winding 58. The magnitude and polarity of this induced voltage, as it surges to its peak, are such that the output voltage, measured at the output end of winding 58, momentarily swings positive with respect to the reference bus whenever the negative voltage at conductor 53a is increased, whereas it increases in a negative sense in response to any sudden decrease in magnitude of the negative applied voltage. Capacitor 69 serves to reduce the magnitude but extend the duration of this negative-going surge of output voltage.

The adjustably tapped resistor 56 connected in parallel with winding 54 of the autotransformer provides convenient means for changing the amount of time required to charge or discharge the capacitor 55. A very accurate time delay is obtained by using the above-described arrangement because of the rapid rate of change of the output voltage as it approaches its new magnitude level a short time after a change in the magnitude of the applied voltage.

The time delay means just described is made unilaterally effective by connecting a diode 70 in parallel therewith, as is shown in FIG. 3. The diode 70, which is connected between conductors 53a and 59, is so poled that the potential of conductor 59 will never be appreciably less negative than the potential of conductor 53a. It is apparent, therefore, that a sudden increase in the negative potential of conductor 53a, as occurs at the beginning of each keying signal period, will be immediately reflected by a corresponding increase in the negative-going transmitter stopping signal developed at conductor 59 by the symmetry adjusting component 37. In other words, by shunting the energy storing circuit of the time delay means, diode 70 enables the transmitter stopping signal to be initiated without time delay at the beginning of each keying signal period, and consequently the stopping and keying signals exist contemporaneously.

On the other hand, at the conclusion of each keying signal period, the time delay means of the symmetry adjusting component 37 is effective to prolong the transmitter stopping signal and delay its termination for a predetermined short interval of time. When the voltage at conductor 53a suddenly decreases at the end of each keying signal period, the energy storing circuit of the time delay means operates in the manner already explained to sustain a negative output voltage for a predetermined length of time. Transistor 63 of the signal amplifier 61, having previously been conductive, continues in a conductive state until there is insufficient negative potential at the output end of winding 58 to maintain a forward bias on its emitter-base junction. As long as transistor 63 is conductive, the conductor 59 emanating from the symmetry adjusting component is energized, and the stopping signal is sustained, even though the keying signal has stopped and conductor 53a is deenergized. But as soon as the output of the time delay means has fallen below the lowest level at which it can effectively maintain a forward bias on the emitter-base junction of transistor 63, this transistor becomes non-conductive and the potential of conductor 59 changes to a level nearly the same as that of the reference bus. The parameters of the time delay means are selected so that the time which elapses before its output voltage diminishes to below the aforesaid lowest effective level, following the conclusion of each period of the keying signal, just corresponds to the desired interval of delay in the initiation of carrier-current transmission from the local terminal.

Unusually accurate timing by the symmetry adjusting component 37 and added abruptness in the termination of the prolonged stopping signal are obtained, in accordance with the teachings of the above-mentioned divisional application S.N. 413,580, by providing means for increasing the rate of decay of the voltage across capacitor 55 and the autotransformer winding 58 as its decreases to less than its lowest effective level of magnitude. As is shown in FIG. 3, the means referred to comprises a normally inactive asymmetrically conductive circuit 71 which is connected across the series combination of capacitor 55 and winding 54 to provide, when activated, a relatively low-impedance path for the flow of discharge current from capacitor 55. In other words, when capacitor 55 begins to discharge under conditions of decreasing applied voltage, the low-impedance circuit 71 becomes effective to shunt the impedance across the input of the time delay means, thereby enabling the capacitor 55 to discharge at a faster rate than would otherwise be achieved.

Preferably the circuit 71 comprises an NPN transistor 72 whose collector is connected to the reference bus. The emitter-base junction of transistor 72, in series with a base resistor 73 is connected in parallel-circuit relationship with the diode 57, the emitter-base junction being poled in opposition to the direction of forward current flow through the diode 57. Thus, the emitter-base junction of transistor 72 is forward biased and the transistor is activated only when discharge current begins flowing from the capacitor 55, through resistor 50, conductors 53 and 53a and resistor 73, and into the base electrode of the transistor. Under such a condition, which occurs at the conclusion of each keying signal period, the transistor 72 is rendered conductive and provides a relatively low-impedance path in parallel with resistor 50 for the flow of discharge current.

The intermittent stopping signal produced by the symmetry adjusting component 37 is fed by conductor 59 to the transmitter control logic component 34 of the Keying Circuit. The transmitter control logic component 34 is also connected, by way of conductor 48, to the low-set Fault Detector FD-L. Whenever component 34 is energized by a starting signal received from FD-L in the absence of the stopping signal, it will produce, at a conductor 74, a control signal for initiating carrier-current transmission by the local transmitter.

As indicated in FIG. 3, the control signal (suitable for enabling the carrier-current transmitter to operate) is developed at the conductor 74 upon activation of a PNP transistor 75. The collector of transistor 75 is connected directly to the negative supply voltage terminal, while its emitter is connected to the reference bus through an emitter follower resistor 76. Conductor 74, being connected to the emitter of transistor 75, is energized whenever this transistor is conductive. The base electrode of the transistor 75 is directly connected to the collector of a normally active PNP transisor 77. The emitter of transistor 77 is connected to the reference bus, and a load resistor 78 is connected between the negative supply voltage terminal and the collector of this transistor. The base electrode of transistor 77 is connected through a resistor 79 to the reference bus, and by means of an appropriately energized conductor 80, which is connected to its base electrode, a forward bias normally is maintained on the emitter-base junction of the transistor 77.

It will be apparent that as long as the transistor 77 is conductive (active), the base electrode of transistor 75 is maintained at nearly the same potential level as the reference bus, and no activating signal current can flow in the emitter-base junction of transistor 75. In order to effect current flow in the emitter-base junction of transistor 75, and hence activate this transistor, conduction in transistor 77 must be reduced or stopped altogether. Transistor 77 is rendered non-conductive upon deenergization of the conductor 80.

The conductor 80 is normally energized as a result of conduction by a normally active PNP transistor 81, referred to hereinafter as the standby transistor. As can be seen in FIG. 3, the conductor 80 is connected through a Zener diode 82 to the emitter of the standby transistor. The emitter of transistor 81 is connected to the reference bus by way of emitter follower resistors 83a and 83b, the resistance of resistor 83b being only a small portion (preferably about one-fifth) of the resistance of the resistor 83a. The collector of transistor 81 is coupled to the negative supply voltage terminal by a circuit including a current limiting resistor 84 having a relatively small value of resistance. Another resistor 85 is connected between the base electrode of the standby transistor 81 and the negative supply voltage terminal. With this arrangement, its emitter-base junction being forward biased, the standby transistor is normally in a conductive state, and the conductor 80 is connected to the negative supply voltage terminal through a relatively low-impedance path including the emitter-collector circuit of the standby transistor.

The magnitude of the control signal produced at the above-mentioned conductor 74 is changed by varying the amount of energization of the conductor 80. By properly controlling such variations, the carrier-current channel of the protective relaying system can be used for the purpose of telemetering, telephony, or other auxiliary functions. Toward this end, I have shown schematically in FIG. 3 a reserve signal component 86 comprising a normally closed contact 87 of a push button switch serially connected in the collector circuit of the standby transistor 81, with an adjustably tapped resistor 88 being connected in parallel with the contact 87. This is a symbolic representation of a telemetering arrangement or the like. Whenever the switch contact 87 is open, a controlled amount of additional impedance is connected in the collector circuit of the standby transistor, whereby the energization of conductor 80 is weakened, the forward bias on the emitter-base junction of transistor 77 is reduced, and transistor 75 is partially "turned on."

In order completely to deenergize the conductor 80, thereby fully turning on the transistor 75 and producing at conductor 74 a control signal of maximum magnitude, the standby transistor 81 must be deactivated. This is accomplished, as can be seen in FIG. 3, by the activation of another PNP transistor 89 to be referred to hereinafter as the starting transistor of the transmitter control logic component 34. The collector of the starting transistor 89 is connected directly to the base electrode of transistor 81, while its emitter is connected through a silicon diode 90 and resistor 83b to the reference bus. The base electrode of transistor 89 is connected to the reference bus through a base resistor 91 in parallel with a voltage limiting Zener diode 92, and it is also connected by means of a current limiting resistor 93 and an isolating diode 94 to the conductor 48 which is energized by the continuous starting signal produced by the Fault Detector FD–L.

The silicon diode 90, in the manner described hereinbefore in connection with diode 49, prevents activation of the starting transistor 89 until its base electrode is energized by the negative starting signal received from FD–L. As soon as the starting signal is applied to the transmitter control logic component 34, current flow is effected in the emitter-base junction of the starting transistor 89 thereby activating this transistor and causing the potential level at the base electrode of the standby transistor 81 to become nearly equal to that of the reference bus. As a result, conduction in the emitter-base junction of the standby transistor 81 is stopped, and the standby transistor is deactivated. The speed with which this action takes place is increased by the inclusion of resistor 83b in the emitter circuit of the starting transistor 89. As current flow through the emitter follower resistors 83a and 83b decreases, the potential at the emitter of transistor 89 becomes more positive thereby aiding activation of this transistor and consequently accelerating the deactivation of the standby transistor 81.

Because of the Zener diode 82 connected between conductor 80 and the emitter of the standby transistor 81, the conductor 80 is completely deenergized with extreme promptness upon deactivation of the standby transistor. Those skilled in the art will understand that the Zener diode introduces a very high impedance in circuit with conductor 80 whenever the voltage appearing across resistors 83a and 83b is reduced to a predetermined magnitude. Thus the transistor 77 is abruptly rendered nonconductive and a control signal of maximum magnitude quickly appears at conductor 74 even before the standby transistor 81 is fully "turned off" in response to activation of the starting transistor 89 by a starting signal.

In order to reenergize the conductor 80 and thereby discontinue the control signal at conductor 74, even though the base electrode of the starting transistor 89 is energized by a starting signal, still another PNP transistor 95 is provided. Transistor 95 will be referred to hereinafter as the stopping transistor of the transmitter control logic component 34. The emitter of this transistor, as is shown in FIG. 3, is connected to the emitter of the starting transistor 89, while its collector is connected through a load resistor 96 in series with another resistor 97 to the negative supply voltage terminal. The resistance of the resistor 97 is quite small compared to that of resistor 96. A base resistor 98 is connected between the reference bus and the base electrode of the stopping transistor 95, and this base electrode is also connected, by means of a resistor 99 and an isolating diode 100, to the conductor 59 which is energized by the intermittent stopping signal produced by the symmetry adjusting component 37. Thus, the emitter-base junction of the stopping transistor 95 will be forward biased, and this transistor will consequently be rendered conductive (active), whenever the negative stopping signal is applied to the transmitter control logic component 34.

Wherever the stopping transistor 95 is active, the potential of the emitter of the starting transistor 89 will be at a negative level determined in part by the emitter current of transistor 95 flowing through the resistor 83b. The parameters of the transmitter control logic component are selected so that there can be no conduction in the emitter-base junction of the starting transistor 89 under this condition, and as a result the standby transistor 81 is able to resume conduction. This is true even though there is a starting signal applied to component 34, since even the maximum magnitude of the negative signal at the base electrode of transistor 89, as limited by the Zener diode 92, is insufficient to effect forward bias of this transistor when the stopping transistor 95 is in its conductive state. Should the stopping transistor be activated while a starting signal is subsisting, conduction in the emitter-base junction of the starting transistor 89 will quickly stop, the promptness of response being increased by the "positive feedback" effect of the resistor 83b which causes the potential at the emitter of transistor 89 to become more negative in response to the increasing conduction which immediately occurs in the standby transistor 81. It is apparent in FIG. 3 that with the stopping transistor 95 active, and hence the starting transistor 89 "turned off," the standby transistor 81 will be in its normally conductive state and the conductor 80 is fully energized. Accordingly, the transmitter control logic component 34 cannot produce a control signal during the intervals it is energized by the transmitter stopping signal.

In order to ensure that the re-establishment of full energization at conductor 80 in response to the intermittent stopping signal is not impeded by operation of the reserve signal component 86, I provide an NPN transistor 101 for shunting the component 86, as is shown in FIG. 3. The emitter-collector circuit of the transistor 101 is connected between the resistor 84 and the negative supply voltage terminal, with a silicon diode 102 being inserted in the emitter connection as shown. The base electrode of the transistor 101 is connected to the junction between resistors 96 and 97. With this arrangement, the transistor 101 is rendered conductive in response to activation of the stopping transistor 95, and the collector current of the standby transistor 81 is assured a low-impedance path to the negative supply voltage terminal even though the switch 87 of the reverse signal component 86 may be open.

Sometimes it is desirable to use the illustrated phase-comparison protective relaying system in combination with a "directional-comparison" relaying scheme arranged to be effective under certain kinds of line fault conditions. In such situations, suitable distance relays and control means (not shown) would be disposed at each terminal of the protected transmission line for controlling the transmission of carrier current. In order to accommodate these additional components, the transmitter control logic component 34, is provided with appropriate terminals X and Y, as is shown in FIG. 3.

Terminal X, which is connected through an isolating diode 103 to the base electrode of the starting transistor 89, is intended to be energized continuously by a negative signal, thereby effecting carrier-current transmission from the local transmission line terminal, upon operation of one of the distance relays in response to a balanced polyphase fault occurring on a selection of the high-voltage electric power system located "behind" the local terminal. Terminal Y, which is connected through an isolating diode 104 to the base electrode of the stopping transistor 95, is intended to be energized continuously by a negative signal, thereby activating the stopping transistor and hence preventing carrier-current transmission from the local terminal of the line, upon operation of another distance relay in the event a balanced polyphase fault should occur on the protected line. The last-mentioned relay operation also results in the simultaneous production of a tripping control signal for energizing a terminal Z associated with the comparer logic components 39a and 39b shown in FIG. 4.

The blocking cancellation component 49 of the Keying Circuit shown in FIG. 3 will be described at a later point in this specification.

Turning next to FIG. 4, preferred embodiments of the Comparing Circuit components of my phase-comparison protective relaying system will now be described in greater detail. The phase delay component 38, which is connected to the branch conductor 53b for energization by the intermittent keying signal produced in the Keying Circuit (FIG. 3), has again been shown in block form in FIG. 4. This component comprises suitable phase shifting means having an output during intervals which are dependent upon but controllably retarded with respect to the periods of its energization. Although particular details of the phase delay component are not critical to the practice of my invention, the desired result can be obtained by utilizing a circuit arrangement similar to the time delay means comprising elements 54–56, 58 and 60–62 described above in connection with the symmetry adjusting component 37 shown in FIG. 3.

The phase delay component 38 shown in FIG. 4 will produce an output during half-cycle intervals having a predetermined lagging phase displacement with respect to the half-cycle periods of the intermittent keying signal. This intermittent output appears in the form of a negative-going signal at a conductor 105 emanating from the component 38. As has been mentioned hereinbefore, the phase delay component is so arranged that each of its half-cycle output intervals is concurrent with operation of the local receiver R whenever the transmission line currents at the two terminals of the protected transmission line are substantially in phase.

The phase delay component 38 is connected by means of the conductor 105, a current limiting resistor 106 and an isolating diode 107 to the base electrode of a PNP transistor 108 located within the comparer logic component 39b of the Comparing Circuit. The base electrode of another PNP transistor 109, which is disposed in tandem with transistor 108, is connected through a current limiting resistor 110 and an isolating diode 111 to a conductor 112 for energization by a pickup signal received from the high-set Fault Detector FD-H. The potential of the pickup signal is negative with respect to the reference bus and has a magnitude nearly equal to the magnitude of the supply voltage.

As can be seen in FIG. 4, the collector of the transistor 109 is connected directly to the negative supply voltage terminal. The emitter of transistor 109 and the collector of transistor 108 are interconnected as shown. The emitter of the transistor 108 is connected to the reference bus through a silicon diode 113 and an emitter follower resistor 114. The function of diode 113 is the same as that performed by the silicon diode 49 of the keying logic component 36 which has been described hereinbefore. A base resistor 115 is connected between the emitter follower resistor 114 and the base electrode of transistor 108, while a base resistor 116 is connected between resistor 114 and the base electrode of transistor 109.

The comparer logic component 39b can operate to produce an output signal at a conductor 117, which emanates therefrom, only when both of the transistors 108 and 109 are rendered conductive. As long as either transistor is in a non-conductive condition (inactive), the emitter follower resistor 114 is coupled to the negative supply voltage terminal through a very high-impedance circuit, and the potential level of the conductor 117, which is connected to the relatively negative terminal of this resistor, is nearly the same as that of the reference bus. But with both transistors rendered conductive, their emitter-collector circuits are both in relatively low-impedance states, a large portion of supply voltage appears across the resistor 114, and the conductor 117 is effectively energized by a large negative potential.

It is apparent in FIG. 4 that in order for both of the transistors 108 and 109 to be conductive, their respective base electrodes must simultaneously be energized by the phase delay component output and the pickup signal, respectively. As soon as the intermittent output of the phase delay component 38 is applied to the comparer logic component, current flow is effected in the emitter-base junction of transistor 108 thereby activating this transistor. However, no significant amount of collector current will flow unless the emitter-base junction of the companion transistor 109 is forward biased by the pickup signal received from FD-H. Only when both transistors are simultaneously active is the conductor 117 effectively energized, and during each line-frequency cycle such a condition can exist for no longer than a half-cycle interval as determined by the keying signal received from the associated Keying Circuit.

In order to render the comparer logic component 39b inactive and thereby prevent production of its output signal during the time that the local carrier-current receiver R is operating, the collector-emitter circuit of another PNP transistor 118 is connected between the base electrode of transistor 108 and the reference bus. As can be seen in FIG. 4, the base electrode of transistor 118 and the reference bus are interconnected by a base resistor 119, and a silicon diode 120 poled as shown is inserted between the emitter of this transistor and the reference bus. The base electrode of the transistor 118 is connected through a current limiting resistor 121 to a conductor 122 which is energized by the blocking signal received from the local receiver R. The potential of the blocking signal is negative with respect to the reference bus and has a suitably large magnitude.

It is apparent that the emitter-base junction of the transistor 118 will be forward biased, thereby activating the transistor, whenever its base electrode is energized by the blocking signal. It is also apparent that whenever the transistor 118 is active, the base electrode of the transistor 108 is tied to the reference bus through a low-impedance path including the emitter-collector circuit of transistor 118, whereby no activating signal current will flow in the emitter-base junction of transistor 108. In other words, activation of the transistor 118, in response to production of the blocking signal, results in the output signal of the phase delay component 38 being bypassed to the reference bus without effecting conduction in the transistor 108. Consequently the transistor 108 is maintained inactive and no output signal can be produced at the conductor 117 throughout the blocking signal periods.

Under line fault conditions of sufficient severity to operate the Fault Detector FD-H, as indicated by the application of a continuous pickup signal to the comparer logic component 39b, this component will produce at conductor 117 a periodic output signal the duration of which, within each line-frequency cycle, corresponds to the time during which the phase delay component 38 is producing an output (in response to activation by the intermittent keying signal) without concurrent operation of the local receiver R (no blocking signal). As has been mentioned hereinbefore, in the event of an external or through fault condition, the line currents at the respective transmission line terminals being then in phase, no output signal will be produced because the receiver is operating (due to carrier-current transmission from the remote terminal) concurrently with the entire half-cycle output interval of the phase delay component 38. But when an internal fault occurs on the protected transmission line, there will be little or no overlap between the intervals of receiver operation and the phase delay output, and the comparer logic component produces an output signal which, during each line-frequency cycle, is at least the major portion of one-half cycle in duration.

The output signal of the comparer logic component 39b is converted to a tripping signal by an integrating arrangement which will now be described. As can be seen in FIG. 4, the conductor 117 emanating from component 39b is connected to the reference bus by way of an R-C circuit comprising a resistor 123 and a capacitor 124. Thus the capacitor 124 is charged by the negative output signal produced upon simultaneous activation of the transistors 108 and 109. The resistor 123 has a value of resistance that is relatively large compared to the resistance of the emitter follower reistor 114, and it is shunted by a diode 125 so poled as to expedite the discharge of capacitor 124 by providing a low-impedance bypass for the flow of discharge current therefrom.

The voltage across capacitor 124 provides an input signal for a level detector 126 which is connected thereto. The level detector 126, shown in block form in FIG. 4, comprises appropriate means for producing a negative tripping signal of substantially constant magnitude in substantially instantaneous response to the magnitude of its input attaining a predetermined critical level. For this level detector I prefer to use the exceptionally accurate and stable transistor switching circuit disclosed and claimed in my Patent 3,067,340, referred to hereinbefore. The parameters of the R-C circuit 123, 124 and the level detector 126 are selected so that the charge on capacitor 124 will not attain the critical level required to trigger the level detector 126 unless the output signal of component 39b persists for at least a predetermined minimum length of time.

In other words, no tripping signal is produced until the comparer logic component 39b has been activated, in the absence of a blocking signal, for an internal of at least the aforesaid minimum length. The minimum interval preferably is slightly greater than one-sixth of a line-frequency cycle, and this short postponement of the tripping signal avoids false operation of my relaying system due to spurious signals of brief duration.

The tripping signal produced by the level detector 126 is supplied by means of a conductor 127 to a trip relay 128 which is shown in block form in FIG. 4. The trip relay 128, illustrated symbolically by a normally open relay contact 129 in series with an auxiliary battery 130, preferably is designed to close its contact 129 in extremely fast response to the application of a tripping signal of a very short duration closing the contact 129 completes an energizing circuit, including the battery 130, for the trip coil 26 of the local circuit breaker 14 (FIG. 1). Although not shown in FIG. 4, the trip relay 128 preferably includes a seal-in arrangement whereby the energizing circuit for the trip coil, once completed, remains intact until a position indicating contact 131 of the local circuit breaker (FIG. 1) opens during the circuit interrupting operation thereof.

Reference has been made hereinbefore to the possible utilization of a directional-comparison relaying scheme in conjunction with the illustrated phase-comparison protective relaying system. For such purposes, the comparer logic component 39b is provided with an appropriate terminal Z, as is shown in FIG. 4. This terminal is connected to the base electrode of the transistor 108 by way of a current limiting resistor 132 and an isolating diode 133, and it is also connected to the base electrode of the transistor 109 through another isolating diode 134 and the resistor 110. Upon continuous energization of the terminal Z by a negative tripping control signal, produced in response to the operation of an appropriate distance relay (not shown), both of the transistors 108 and 109 are simultaneously activated, whereby the comparer logic component is rendered operative to produce a continuous output signal if no blocking signal is being received from the local carrier-current receiver R.

The tripping signal produced at conductor 127, whenever a comparer logic output signal persists for longer than the aforesaid minimum interval, in addition to being supplied to the trip relay 128 described above, is also supplied, by means of a conductor 135 which is a branch of the conductor 127, to the blocking cancellation logic component 40 located in the Keying Circuit (FIG. 3). The function of the blocking cancellation logic component is to disable the local transmitter T as soon as the tripping signal is initiated as has been explained hereinbefore. The detail circuitry of this component will next be described.

Referring now to FIG. 3, it will be observed that the conductor 135 which conveys a tripping signal from the Comparing Circuit is connected through a current limiting resistor 136 and an isolating diode 137 to the base electrode of a PNP transistor 138 located within the blocking cancellation logic component 40. The base electrode of another PNP transistor 139, which is disposed in tandem with transistor 138, is connected through a current limiting resistor 140 to the conductor 48 for energization by the stopping signal received from the low-set Fault Detector FD–L. The emitter of the transistor 139 is connected through a silicon diode 141 and an emitter follower resistor 142 to the reference bus. The collector of transistor 139 and the emitter of transistor 138 are interconnected as shown. The collector of the transistor 138 is connected to the negative supply voltage terminal through a resistor 143 having a value of resistance which is relatively small compared to that of the resistor 142. A base resistor 144 is connected between the emitter follower resistor 142 and the base electrode of transistor 138, while a base resistor 145 is connected between resistor 142 and the base electrode of transistor 139.

The emitter-base junction of an NPN signal amplifying transistor 146 is connected across the resistor 143, as can be seen in FIG. 3. The collector of this transistor is connected through a load resistor 147 to the reference bus, and it is also connected by way of a conductor 148, an isolating diode 149 and the resistor 99, to the base electrode of the stopping transistor 95 located in the transmitter control logic component 34. A silicon diode 150 poled as shown is connected between the emitter of the transistor 146 and the negative supply voltage terminal. The silicon diodes 141 and 150 both function, for reasons explained hereinbefore in connection with diode 49, to ensure that the transistors with which they are respectively associated are not activated as a result of collector leakage current.

The blocking cancellation component 40 operates, when its transistor 146 is active, to produce a transmitter stopping signal at the conductor 148 emanating therefrom. Before the transistor 146 has been activated, the potential level at conductor 148 is nearly the same as that of the reference bus. With the transistor 146 active, however, its emitter-collector circuit will be in a low-impedance state and the conductor 148 is effectively energized by a negative potential almost equal to the magnitude of the unipolarity supply voltage. Under such conditions, current flow is effected in the emitter-base junction of the stopping transistor 95 of the transmitter control logic component 34, the stopping transistor is activated, and no control signal (at conductor 74) can be produced by the Keying Circuit It is apparent in FIG. 3 that the signal amplifying transistor 146 is active when its emitter-base junction is forward biased as a result of collector current flowing from the transistor 138. This condition occurs only when both of the transistors 138 and 139 are simultaneously rendered conductive. In order for both of the transistors 138 and 139 to be conductive, their respective base electrodes must simultaneously be energized by the tripping and starting signals, respectively. As soon as the negative starting signal is applied to component 40, current flow is effected in the emitter-base junction of transistor 139 thereby activating this transistor. However, no significant amount of collector current will flow until the emitter-base junction of the companion transistor 138 is forward biased by the negative-going tripping signal which is received by way of conductor 135.

In order to prolong operation of the blocking cancellation component 40 and thereby obtain a continuous stopping signal at conductor 148 following simultaneous activation of both transistors 138 and 139 in the above-described manner, a portion of its stopping signal is fed back to the base electrode of transistor 138 by means of a time delay seal-in circuit. The seal-in circuit comprises a conductor 151, a current limiting resistor 136a, and an isolating diode 137a serially connected between the conductor 148 and the base electrode of the transistor 138. A transient supppressing capacitor 152 of relatively small capacitance is connected between diode 137a and the reference bus in order momentarily to delay passage of the signal from conductor 151 to the base electrode of transistor 138, whereby no seal-in can be effectuated by short-term transient signals which may appear on conductor 135 or 148. But once the stopping signal has persisted for longer than a brief interval, as it will under true tripping conditions, a forward bias on the emitter-base junction of transistor 138 will be maintained even though the tripping signal is periodically discontinued, and as a result the stopping signal at conductor 148 will be sustained until the starting signal is removed when FD-L stops operating.

Returning now to the Comparing Circuit shown in FIG. 4, the means for obtaining the time delay transient blocking function of my invention will now be considered in detail. The objective of this function, as has been explained hereinbefore, is to block operation of the comparer logic component 39b in delayed response to the occurrence of an external or through fault condition. To obtain the desired blocking effect, the blocking logic component 39a is provided, and this component comprises a PNP transistor 153 which is incorporated within the broken-line block identified by the legend "comparer logic" in FIG. 4.

The transistor 153 is arranged generally parallel to the transistor 118. The collector of transistor 153 is connected through the isolating diode 107 to the base electrode of the transistor 108 of the comparer logic component 39b, while its emitter is connected through the silicon diode 120 to the reference bus. The base electrode of the transistor 153 is connected through a base resistor 154 to the reference bus, and it is also connected, by way of a current limiting resistor 155, to a conductor 156 which is energized by the transient blocking signal produced by the time delay means 41. The potential of the transient blocking signal is negative with respect to the reference bus and has a magnitude nearly equal to the magnitude of the supply voltage.

It is apparent that the emitter-base junction of the transistor 153 will be forward biased, thereby activating the transistor, whenever its base electrode is energized by the transient blocking signal. Whenever the transistor 153 is active, the base electrode of transistor 108 is tied to the reference bus through a low-impedance path including the emitter-collector circuit of the transistor 153, whereby the intermittent output signal of the phase delay component 38 is shorted down and the comparer logic component 39b is rendered inactive. Consequently, no tripping signal can be produced at the conductor 127 by the output signal of the phase delay component when the transient blocking means is operating to produce the transient blocking signal at the conductor 156.

The time delay means 41 shown in FIG. 4 comprises a resistor 157, a capacitor 158 and a level detector 159. The R-C circuit formed by the resistor 157 and capacitor 158 is connected between a conductor 160 and the reference bus, and thus the capacitor will accumulate charge upon energization of the conductor 160. The voltage across capacitor 158 provides an input signal for the level detector 159 which is connected thereto. The level detector 159, shown in block form in FIG. 4, is preferably similar to the level detector 126 described hereinbefore. It operates to produce the transient blocking signal in substantially instantaneous response to the magnitude of its input signal attaining a first predetermined critical level, and the signal so produced is maintained until the input magnitude falls below a second predetermined critical level, the second critical level being lower than the first.

The parameters of the R-C circuit 157, 158 and the level detector 159 are selected so that the charge on capacitor 158 will not reach the first critical level, required to trigger the level detector 159, until the conductor 160 is continuously energized by a predetermined negative signal for a period of one and one-half cycles (on a line-frequency base). The charge on capacitor 158 will never attain this first critical level if the conductor 160 is periodically energized for intervals of only one-half cycle during each line-frequency cycle. If such half-cycle energization of the conductor 160 should occur sometime after the conductor 160 has been continuously energized for sufficiently long to cause operation of the level detector 159, the charge on capacitor 158 will not fall below the second critical level (and subsequently remain below its first critical level) until the conductor 160 is continuously deenergized for an entire one-half cycle interval.

Energization of the conductor 160 is controlled by the pickup logic component 42a which comprises a PNP transistor 161. In FIG. 4 the transistor 161 is shown within the broken-line block identified by the legend "transient blocking logic." The collector of transistor 161 is connected directly to the negative supply voltage terminal, while its emitter is connected through a silicon diode 162 (same purpose as diode 49 explained hereinbefore) and an emitter follower resistor 163 to the reference bus. The base electrode of this transistor is connected to the resistor 163 by a base resistor 164. Circuit means, including a current limiting resistor 165, is provided to connect the base electrode of transistor 161 to a first input terminal 166 of the transient blocking means, and the input terminal 166 is connected to the conductor 112 for energization by the continuous pickup signal received from the high-set Fault Detector FD-H. The conductor 160 is connected to the relatively negative terminal of the emitter follower resistor 163.

It is apparent in FIG. 4 that energization of the base electrode of the transistor 161 by the pickup signal, which is applied to the input terminal 166, will effect current flow in the emitter-base junction of this transistor. Upon activation of transistor 161 in this manner, its emitter-collector circuit being then in a low-impedance state, a large portion of the supply voltage will appear across the emitter follower resistor 163, and the conductor 160 is effectively energized by a relatively large negative potential. If this energization of conductor 160 should continue without interruption, the time delay means 41 will produce the transient blocking signal at conductor 156 after a time delay of one and one-half cycles.

For the purpose of preventing continuous energization of the conductor 160 when an internal line fault occurs, the transient blocking means includes the knockout logic component 42b which comprises a pair of PNP transistors 167 and 168. The collector of the transistor 167 is connected directly to the base electrode of the transistor 161, while the emitter of transistor 167 is connected through a silicon diode 169 to the reference bus. Thus, the emitter-collector circuit of the transistor 167 is connected in parallel circuit relationship with the emitter-base junction of transistor 161. The base electrode of the transistor 167 is connected through a base resistor 170 to the reference bus, and by means of a circuit including a pair of resistors 171 and 172, it is also connected to a second input terminal 173 of the transient blocking means. The input terminal 173 is connected to the conductor 105 for energization by the output signal of the phase delay component 38 which operates in response to the intermittent keying signal received from the associated Keying Circuit.

During the intervals of activation of the comparer logic component 39b in response to the keying signal, the input terminal 173 in the transient blocking means is energized and a negative knockout signal is generated at the base electrode of the transistor 167. This periodic knockout signal effects current flow in the emitter-base junction of the transistor 167, thereby activating this transistor. It is apparent in FIG. 4 that whenever the transistor 167 is active, its emitter-collector circuit being then in a low-impedance state, the pickup signal applied to the input terminal 166 is bypassed to the reference bus, activation of transistor 161 is prevented, and while the transistor 161 is thus disabled, the conductor 160 cannot be effectively energized.

The transistor 167 is itself disabled (rendered non-conductive) by the companion transistor 168. As can be seen in FIG. 4, the collector of transistor 168 is connected through the resistor 172 to terminal 173, while the emitter of the transistor 168 is connected through the silicon diode 169 to the reference bus. The function of the diode 169 is to prevent activation of either transistor 167 or 168 as a result of collector leakage current. The base electrode of the transistor 168 is connected through a base resistor 174 to the reference bus, and by means of a circuit including a current limiting resistor 175, it is also connected to a third input terminal 176 of the transient blocking means. The input terminal 176 is connected to the conductor 122 for energization by the negative blocking signal received from the local carrier-current receiver R.

Energization of the base electrode of the transistor 168 by the blocking signal effects current flow in the emitter-base junction of this transistor. Upon activation of transistor 168 in this manner, its emitter-collector circuit being then in a relatively low-impedance state, the quantity energizing the input terminal 173 is bypassed to the reference bus and no knockout signal can be produced at the base electrode of the transistor 167. Thus, activation of the transistor 167 is prevented whenever the local receiver R is operating. As long as the transistor 167 is disabled in this manner, effective energization of the conductor 160 cannot be prevented.

The foregoing control means is the subject matter of my divisional patent application Ser. No. 413,579, filed November 24, 1964, and assigned to the assignee of the present application. Its overall operation in the present setting can be briefly stated. The conductor 160 will be effectively energized when a pickup signal is applied to the input terminal 166, except during those periods when the input terminal 173 is being energized by the output of the phase delay component 38 in the absence of energization of the input terminal 176 by a blocking signal. As has been explained hereinbefore, during an external fault condition the phase delay component output and the blocking signal occur contemporaneously, and consequently the conductor 160 will be energized continuously and the time delay circuit 41 is able to produce the transient blocking signal in delayed response thereto. On the other hand, during an internal fault condition there is no blocking signal during the intervals that the input terminal 173 is energized, whereby a half-cycle periodic knockout signal will be produced in the transient blocking means, and the time delay circuit 41 is energized only between successive periods of this knockout signal. As a result of the periodic deenergization of the time delay circuit, no transient blocking signal will be produced or, if previously being produced, it will be discontinued after a time delay of one-half to one and one-half cycles.

While I have shown and described preferred forms of my invention by way of illustration, many modifications will occur to those skilled in the art. I contemplate, therefore, by the claims which conclude this specification to cover all such modifications as fall within the true spirit and scope of my invention.

What I claim as new and desire to secure by Letters Patent of the United States is:

1. In a fault responsive protective relaying system for an alternating current electric power transmission line: signal transmitting means for sending a signal from a local terminal to a remote terminal of the transmission line; signal receiving means operative in response to a signal being sent from said remote terminal to said local terminal; means for initiating operation of the transmitting means in response to the occurrence of any line fault between said local and remote terminals; means adapted to be coupled to the line at said local terminal for deriving a single-phase alternating electric quantity representative of line currents under fault conditions; and means controlled by said representative quantity for concurrently stopping operation of the transmitting means and initiating a predetermined relaying operation only when the representative quantity has a predetermined polarity, said receiving means being connected and arranged to prevent said relaying operation when the receiving means is operative.

2. A phase-comparison pilot relaying system for protecting a polyphase alternating current electric power transmission line comprising: signal transmitting means located at each of two spaced-apart terminals of the transmission line; signal receiving means located at each of the terminals, each receiving means being operable in response to transmission by the transmitting means located at the opposite terminal; fault detecting means at the termnials for causing transmission by said transmitting means in response to the occurrence of a fault on the line; phase responsive means adapted to be coupled to the line at each of its terminals for producing intermittent keying signals at the respective terminals, said phase responsive means being so coordinated and arranged that the active periods of the respective keying signals occur alternately when the transmission line currents at the two terminals are substantially in phase and contemporaneously when the line currents at the two terminals are substantially 180 degrees out of phase; control means at the terminals responsive to said keying signals, respectively, for stopping transmission by the respective transmitting means throughout each active period of the associated keying signal; and means supplied by the keying signal and controlled by the receiving means at each of the terminals for initiating a predetermined control function when activated in response to production of the associated keying signal without concurrent operation by the associated receiving means.

3. In a fault responsive protective relaying system for an alternating current electric power transmission line: first and second signal transmitting means located, respectively, at first and second spaced-apart terminals of the transmission line; signal receiving means, operable in response to signal transmission by the second transmitting means, located at said first terminal; fault detecting means at the first terminal for initiating signal transmission by the first transmitting means in response to a fault occurring on the line; phase responsive means adapted to be coupled to the line at its first terminal for deriving a single-phase alternating electric quantity representative of line currents under fault conditions and for producing an intermittent keying signal the periods of which have a time correspondence to alternate half cycles of the representative quantity; control means responsive to the keying signal for stopping signal transmission by the first transmitting means throughout the keying signal periods; and output signal producing means connected to the phase responsive means for activation by the keying signal, said output signal producing means being rendered inactive by said receiving means upon operation thereof.

4. The relaying system set forth in claim 3 in which the control means includes means for delaying the initiation of signal transmission by the first transmitting means for a predetermined short interval following the conclusion of each keying signal period.

5. A phase-comparison pilot relaying system for protecting a polyphase alternating current electric power transmission line comprising: signal transmitting means located at each of two spaced-apart terminals of the transmission line; signal receiving means located at each of the terminals, each receiving means being operable in response to transmission by the transmitting means located at the opposite terminal; phase responsive means adapted to be coupled to the line at each of its terminals for deriving single-phase line-frequency electric quantities representative of transmission line currents at the respective terminals under line fault conditions, control means at said terminals responsive to the polarities of said representative quantities, respectively, for effecting periodic transmission by both transmitting means under fault conditions, each of said control means including means for so adjusting the intervals of transmission by the associated transmitting means that the duration of operation of the receiving means located at the opposite terminal is, during a line-frequency cycle, just equal to one-half the duration of said cycle; and output signal producing means controlled by the phase responsive means and the receiving means at each of the terminals, each of said output signal producing means being activated, during successive line-frequency cycles, for intervals of one-half cycle in accordance with the polarity of the representative quantity derived by the associated phase responsive means and being rendered inactive whenever the associated receiving means is operating; said phase responsive means, control means, and output signal producing means of the relaying system being so coordinated and arranged that each interval of activation of each output singal producing means is concurrent with operation of the associated receiving means when the transmission line currents at the two terminals are substantially in phase.

6. A phase-comparison pilot relaying system for protecting a polyphase alternating current electric power transmission line comprising: signal transmitting means located at one terminal of the transmission line; signal receiving means, operable in response to signal transmission by the transmitting means, located at another terminal of the line; phase responsive means adapted to be coupled to the line at each of said terminals for deriving first and second single-phase alternating electric quantities representative, respectively, of transmission line currents at the two terminals under line fault conditions; control means connected to the transmitting means and to the phase responsive means at said one terminal for controlling the transmitting means in accordance with the polarity of the first representative quantity, said control means being responsive to the occurrence of alternate half cycles of the first quantity for effecting signal transmission by the transmitting means and including means for so adjusting the intervals of signal transmission that the duration of operation of said receiving means during each cycle of the first quantity is equal to one-half the duration of said cycle; output signal producing means associated with the receiving means at the other terminal; and circuit means for controlling the output signal producing means in accordance with the polarity of the second representative quantity, said circuit means being responsive to the occurrence of alternate half cycles of the second quantity to activate the output signal producing means for intervals of one-half cycle and including phase shifting means so arranged that each interval of activation of the output signal producing means is concurrent with operation of the receiving means whenever said alternate half cycles of both the first and second representative quantities are coexistent, said output signal producing means being rendered inactive by the receiving means upon operation thereof.

7. In a fault responsive protective relaying system for an alternating current electric power transmission line: signal transmitting means located at a first terminal of the transmission line; signal receiving means, operable in response to signal transmission by the transmitting means, located at a second line terminal which is remote from the first terminal; fault detecting means at the first terminal for initiating transmission by the transmitting means in response to a fault occurring on the line; first and second phase responsive means adapted to be coupled to the line at said first and second terminals, respectively, for producing under fault conditions first and second intermittent keying signals the phase relationship between which is a function of the relative phase positions of two representative alternating electric quantities correspondingly derived from transmission line currents at the respective terminals; control means at the first terminal responsive to the first keying signal for stopping transmission by the transmitting means throughout each period of the first keying signal, said control means including adjusting means for delaying the initiation of transmission by the transmitting means for a predetermined short interval following the conclusion of each of the first keying signal periods; output signal producing means associated with the signal receiving means at the second terminal, said output signal producing means being rendered inactive whenever the receiving means is operating; and circuit means at the second terminal responsive under fault conditions to the second keying signal for activating the output signal producing means, said circuit means including phase shifting means for controllably retarding by a predetermined amount of time the intervals during which the output signal producing means is activated with respect to the periods of the second keying signal.

8. The protective relaying system of claim 7 in which said adjusting means comprises a time delay circuit energized by said first keying signal to provide a transmitter stopping signal the termination of which is delayed for said predetermined short interval following the conclusion of each period of the first keying signal, the time delay circuit being shunted by a diode so poled as to enable said stopping signal to be initiated immediately upon energization of the time delay circuit at the beginning of each of the first keying signal periods.

9. In a fault responsive protective relaying system for an alternating current electric power transmission line: first and second signal transmitting means located, respectively, at first and second spaced-apart terminals of the transmission line; signal receiving means, operable in response to signal transmission by either of said transmitting means, located at the first terminal; means adapted to be coupled to the line at each of its terminals for enabling said transmitting means, under transmission line fault conditions, to transmit alternately when the line currents at the two terminals are substantially in phase and simultaneously when the line currents at the two terminals are substantially 180 degrees out of phase; fault detecting means at the first terminal operable in response to the occurrence of a line fault; means controlled by said receiving means, said fault detecting means and said enabling means at the first terminal for initiating a predetermined relaying operation only under conditions of simultaneous transmission by said first and second transmitting means; and transient blocking means for blocking said predetermined relaying operation upon operation of the blocking means, said blocking means being controlled by said receiving means and by said fault detecting means for operation with a predetermined time delay only in response to the concurrence of operation of the fault detecting means and a condition of alternate transmission by said first and second transmitting means.

10. A phase-comparison pilot relaying system for protecting a polyphase alternating current electric power transmission line having first and second spaced-apart terminals, comprising: signal transmitting means located at the second line terminal; signal receiving means, operable in response to transmission by the transmitting means, located at the first line terminal; phase responsive means adapted to be coupled to the line at each of said terminals for deriving first and second single-phase alternating electric quantities representative, respectively, of transmission line currents at the first and second terminals under line fault conditions; control means at the second terminal responsive to the polarity of the second representative quantity for effecting periodic transmission by said transmitting means under fault conditions; output signal producing means associated with the receiving means at the first terminal; circuit means for periodically activating the output signal producing means, under fault conditions, in accordance with the polarity of the first representative quantity, said output signal producing means being rendered inactive whenever said receiving means is operating; and transient blocking means connected to the output signal producing means for producing a blocking signal which renders said output signal producing means inactive in delayed response to the occurrence of a transmission line fault, said transient blocking means including means connected to said circuit means and to said receiving means for generating a periodic knockout signal whenever the receiving means is not operating durin the periods of activation of said output signal producing means, and means responsive to said knockout signal for preventing the production of said blocking signal.

11. In a fault responsive protective relaying system for an alternating current electric power transmission line: signal transmitting means located at one terminal of the transmission line; signal receiving means, operable to produce a first blocking signal in response to signal transmission by said transmitting means, located at another line terminal which is remote from said one terminal; phase responsive means adapted to be coupled to the line at each of said terminals for producing, at said one terminal and at said other terminal, respectively, first and second intermittent keying signals the phase relationship between which is a function of the relative phase positions of two representative alternating quantities correspondingly derived, under line fault conditions, from transmission line currents at the respective terminals; control means at said one terminal responsive to the first keying signal for periodically enabling said transmitting means to transmit; fault detecting means at said other terminal for producing a continuous pickup signal in response to the occurrence of a fault on the transmission line; output signal producing means connected to said receiving means and to the phase responsive means at said other terminal for activation in response to the presence of said second keying signal in the absence of said first blocking signal; and transient blocking means comprising a time delay circuit connected to said fault detecting means for producing a second blocking signal which prevents activation of said output signal producing means in delayed response to continuous energization by said pickup signal, first means connected to the associated phase response means and controlled by said second keying signal for generating a periodic knockout signal which intermittently deenergizes the time delay circuit, said time delay circuit being unable to produce said second blocking signal when intermittently deenergized by said knockout signal, and second means connected to said receiving means for preventing generation of said knockout signal in the presence of said first blocking signal, whereby the production of said second blocking signal is dependent upon the relative phase positions of the two representative quantities derived from transmission line currents at the respective terminals of the transmission line.

12. In a fault responsive protective relaying system for an alternating current electric power transmission line: first and second signal transmitting means located, respectively, at first and second spaced-apart terminals of the transmission line; signal receiving means, operable in response to signal transmission by the second transmitting means located at said first terminal; fault detecting means at the first terminal operable in response to a fault occurring on the line; phase response means adapted to be coupled to the line at its first terminal for deriving a single-phase alternating electric quantity representative of line currents under fault conditions; means connected to the phase responsive means and to the receiving means for performing a predetermined control function at the first terminal when effectively activated in response to the occurrence, under fault conditions, of alternate half cycles of said representative quantity, effective activation of said control-function-performing means being prevented when the receiving means is operating; means connected to the phase responsive means and to the fault detecting means for enabling the first transmitting means to transmit in response to the occurrence, under fault conditions, of intermediate half cycles of said representative quantity; and means responsive to the performance of said fault control function while the fault detecting means is operating for continuously disabling the first transmitting means until the fault detecting means stops operating.

13. A phase-comparison pilot relaying system for protecting a polyphase alternating current electric power transmission line comprising: signal transmitting means located at each of two spaced-apart terminals of the transmission line; means adapted to be coupled to the line at each of its terminals for enabling said transmitting means, under transmission line fault conditions, to transmit alternately when the line currents at the two terminals are substantially in phase and simultaneously when the line currents at the two terminals are substantially 180 degrees out of phase; signal receiving means located at each of the terminals, each of said receiving means being operable in response to transmission by the transmitting means located at the opposite terminal; means controlled by said receiving means and said enabling means at each terminal for initiating predetermined relaying operations at the respective terminals only under conditions of simultaneous transmission by the transmitting means; and means at each of the terminals responsive, under line fault conditions, to said relaying operation for disabling the transmitting means at the same terminal.

14. A phase-comparison pilot relaying system for protecting a polyphase alternating current electric power transmission line comprising: signal transmitting means located at each of two spaced-apart terminals of the transmission line; phase responsive means adapted to be coupled to the line at each of its terminals for deriving single-phase alternating electric quantities representative of line currents at the respective terminals under line fault conditions; control means at said terminals responsive to said representative quantities, respectively, for effecting periodic transmission by both transmitting means under fault conditions, said transmitting means being controlled so as to transmit alternately when the line currents at the two terminals are substantially in phase and simultaneously when the line currents at the two terminals are substantially 180 degrees out of phase; signal receiving means located at each of the terminals, each receiving means being operable to produce a blocking signal in response to transmission by the transmitting means located at the opposite terminal; means responsive to the representative quantity and to the blocking signal at each of the terminals for initiating predetermined relaying operations at the respective terminals, a relaying operation being initiated at each terminal during periods of no transmission by the associated transmitting means unless a blocking signal is being concurrently produced by the associated receiving means during such periods; and disabling means connected to said control means at each of the terminals, each disabling means being operable to prevent transmission by the associated transmitting means in response to the initiation of a relaying operation at the same terminal, whereby the initiation of a relaying operation at either of the terminals will immediately result in the cessation of production of said blocking signal by the receiving means located at the opposite terminal.

15. The phase-comparison pilot relaying system of claim 14 in which the disabling means includes means for sustaining operation of the disabling means for as long as a line fault condition persists.

16. A phase-comparison protective relaying system for producing an output signal in high-speed response to the occurrence of a fault on a polyphase A.-C. electric power transmission line having first and second spaced-apart terminals at which intercommunicating signal transmitting and receiving means are respectively located, comprising: first and second phase responsive means adapted to be coupled to the line at said first and second terminals, respectively, for producing under line fault conditions first and second intermittent keying signals the phase relationship between which is a function of the relative phase positions of two representative alternating electric quantities correspondingly derived from transmission line currents at the respective terminals; fault detecting means adapted to be coupled to said signal transmitting means for initiating transmission by the transmitting means to the receiving means in repsonse to a fault occurring on the line; control means connected to said first phase responsive means and responsive to the first keying signal for stopping said transmission by the transmitting means throughout each period of the first keying signal, said control means including a time delay circuit for providing a transmitter stopping signal the termination of which is delayed for a predetermined short interval following the conclusion of each of the first keying signal periods, said time delay circuit comprising inductive means having first and second magnetically coupled windings, a capacitor serially connected with the first winding of said inductive means for energization by the first keying signal, means conductively coupling the second winding of said inductive means and said capacitor in series circuit relationship, and means responsive to the voltage developed across said second winding and capacitor for providing said transmitter stopping signal, with the time delay circuit being shunted by a diode so poled as to enable said stopping signal to be initiated immediately upon energization of the time delay circuit at the beginning of each of the first keying signal periods; output signal producing means adapted to be coupled to said signal receiving means, said output signal producing means being rendered inactive by the receiving means whenever it is receiving from said transmitting means; and circuit means connected to said second phase responsive means and to the output signal producing means, said circuit means being responsive under line fault conditions to the second keying signal for activating the output signal producing means and including phase shifting means for controllably retarding by a predetermined amount of time the intervals during which the output signal producing means is activated with respect to the periods of the second keying signal.

17. In a phase-comparison fault responsive protective relaying system for an alternating current electric power transmission line: signal transmitting means for sending a signal from a local terminal to a remote terminal of the transmission line; signal receiving means operative in response to a signal being sent from said remote terminal to said local terminal; phase responsive means adapted to be coupled to the line at said local terminal for deriving a single-phase alternating electric quantity representative of line currents under fault conditions; keying means connected to the phase responsive means and arranged when operative to produce an intermittent keying signal the periods of which have a time correspondence to alternate half cycles of said representative quantity; fault detecting means for initiating signal transmission by said transmitting means and for rendering the keying means operative in response to a fault occurring on the line; control means responsive to the keying signal for stopping signal transmission by the transmitting means throughout the keying signal periods; and an output signal producing means connected to the keying means for activation by the keying signal, said output producing means being rendered inactive by said receiving means upon operation thereof.

References Cited by the Examiner

UNITED STATES PATENTS

| | | | |
|---|---|---|---|
| Re. 19,034 | 12/33 | FitzGerald | 317—28 |
| 1,930,333 | 10/33 | Bancker | 317—28 |
| 2,419,904 | 4/47 | McConnell | 317—28 |
| 2,751,550 | 6/56 | Chase | 323—68 X |
| 2,834,921 | 5/58 | McConnell | 317—28 |
| 2,879,453 | 3/59 | Hodges et al. | 317—28 |
| 2,892,101 | 6/59 | Bright | 307—88.5 |
| 2,917,674 | 12/59 | Goldsborough | 317—28 |
| 2,962,604 | 11/60 | Brittain | 307—88.5 |
| 2,997,601 | 8/61 | Taylor et al. | 307—88.5 |
| 3,016,466 | 1/62 | Richards | 307—88.5 |

OTHER REFERENCES

"Phase-Comparison Carrier-Current Relay" (McConnell, Cramer and Seeley), A.I.E.E. Transactions, vol. 64, page 825, 1945.

SAMUEL BERNSTEIN, *Primary Examiner.*